(12) United States Patent
Opsal et al.

(10) Patent No.: US 7,747,424 B2
(45) Date of Patent: Jun. 29, 2010

(54) SCATTEROMETRY MULTI-STRUCTURE SHAPE DEFINITION WITH MULTI-PERIODICITY

(75) Inventors: Jon Opsal, Livermore, CA (US); Jingmin Leng, Fremont, CA (US)

(73) Assignee: KLA-Tencor Corporation, San Jose, CA (US)

( * ) Notice: Subject to any disclaimer, the term of this patent is extended or adjusted under 35 U.S.C. 154(b) by 768 days.

(21) Appl. No.: 11/715,635

(22) Filed: Mar. 8, 2007

(65) Prior Publication Data

US 2007/0219737 A1    Sep. 20, 2007

Related U.S. Application Data

(60) Provisional application No. 60/784,074, filed on Mar. 17, 2006.

(51) Int. Cl.
*G06F 17/50* (2006.01)
(52) U.S. Cl. ......................................................... 703/13
(58) Field of Classification Search ............... 703/1, 703/13, 14; 716/9; 702/27, 28; 430/30; 356/625
See application file for complete search history.

(56) References Cited

U.S. PATENT DOCUMENTS

| | | | | |
|---|---|---|---|---|
| 5,607,800 A | 3/1997 | Ziger | | 430/8 |
| 5,739,909 A | 4/1998 | Blayo et al. | | 356/369 |
| 5,867,276 A | 2/1999 | McNeil et al. | | 356/445 |
| 5,889,593 A | 3/1999 | Bareket | | 356/445 |
| 5,963,329 A | 10/1999 | Conrad et al. | | 356/613 |
| 6,429,943 B1 | 8/2002 | Opsal et al. | | 356/625 |
| 6,483,580 B1 | 11/2002 | Xu et al. | | 356/300 |
| 6,694,275 B1 | 2/2004 | Jakadar et al. | | 702/84 |
| 6,704,661 B1 * | 3/2004 | Opsal et al. | | 702/27 |
| 6,813,034 B2 | 11/2004 | Rosencwaig et al. | | 356/601 |
| 6,819,426 B2 | 11/2004 | Sezginer et al. | | 356/401 |
| 7,099,005 B1 | 8/2006 | Fabrikant et al. | | 356/369 |
| 7,145,664 B2 | 12/2006 | Opsal et al. | | 356/601 |
| 2001/0051856 A1 | 12/2001 | Niu et al. | | 702/57 |
| 2003/0044702 A1 * | 3/2003 | Schulz | | 430/30 |
| 2003/0197872 A1 * | 10/2003 | Littau et al. | | 356/625 |
| 2004/0070772 A1 | 4/2004 | Shchegrov et al. | | 356/625 |
| 2004/0181768 A1 * | 9/2004 | Krukar | | 716/19 |
| 2004/0210402 A1 * | 10/2004 | Opsal et al. | | 702/28 |
| 2005/0057760 A1 * | 3/2005 | Opsal et al. | | 356/625 |
| 2006/0012803 A1 * | 1/2006 | Opsal et al. | | 356/625 |
| 2006/0132806 A1 * | 6/2006 | Shchegrov et al. | | 356/625 |
| 2006/0290947 A1 * | 12/2006 | Li et al. | | 356/625 |

* cited by examiner

*Primary Examiner*—Paul L Rodriguez
*Assistant Examiner*—Kandasamy Thangavelu
(74) *Attorney, Agent, or Firm*—Morrison & Foerster LLP

(57) ABSTRACT

A modeling approach is disclosed which addresses samples with different regions where the structures exhibit different periodicities. In this approach, a first partial model is generated which defines the shape, material properties and periodicity of the first region. In addition, a second partial model is generated defining the shape, material properties and periodicity of the second region. These two partial models are then merged into a combined model. When optimizing the combined model, the shape and material properties of the first and second models are independently adjusted. The optical responses of the model with differing shapes and material properties are-calculated and compared to a physical sample. This process is iteratively carried out to derive a final combined model that corresponds to a physical sample.

6 Claims, 4 Drawing Sheets

Origin = (0, 0, 0)   Origin' = ($X_0$, 0, $Z_0$)
Here $X_0 = \Delta$; $Z_0 = H$

Origin = (0, 0, 0)    Origin' = $(X_0, 0, Z_0)$

Here $X_0 = \Delta$;  $Z_0 = H$

SCATTEROMETRY MULTI-STRUCTURE SHAPE DEFINITION WITH MULTI-PERIODICITY

PRIORITY

This application claims priority from U.S. Provisional Application Ser. No. 60/784,074, filed Mar. 17, 2006, the disclosure of which is incorporated herein by reference.

TECHNICAL FIELD

The subject invention relates generally to optical methods for inspecting and analyzing semiconductor wafers and other samples. In particular, the subject invention relates to methods for modeling structures within semiconductor wafers and other scatterometry subjects characterized by multi-periodicity.

BACKGROUND OF THE INVENTION

As semiconductor geometries continue to shrink, manufacturers have increasingly turned to optical techniques to perform non-destructive inspection and analysis of semiconductor wafers. Optical techniques typically apply an incident field (often referred to as a probe beam) to a sample and then detect and analyze the reflected energy. This type of inspection and analysis is known as optical metrology and is performed using a range of optical techniques. Scatterometry is a specific type of optical metrology that is used when the structural geometry of a sample creates diffraction (optical scattering) of the incoming probe beam. Scatterometry systems analyze diffraction to deduce details of the structures that cause the diffraction to occur.

Various optical techniques have been used to perform optical scatterometry. These include broadband spectroscopy (U.S. Pat. Nos. 5,607,800; 5,867,276 and 5,963,329), spectral ellipsometry (U.S. Pat. No. 5,739,909) single-wavelength optical scattering (U.S. Pat. No. 5,889,593), and spectral and single-wavelength beam profile reflectance and beam profile ellipsometry (U.S. Pat. No. 6,429,943). In addition it may be possible to employ single-wavelength laser BPR or BPE to obtain critical dimension (CD) measurements on isolated lines or isolated vias and mesas. The above cited patents and patent applications, along with U.S. Pat. Nos. 6,704,661, 6,819,426, 6,813,034, U.S. Patent Publication No. 2001/0051856 A1, U.S. Pat. Nos. 6,694,275, 6,483,580, 7,099,005, and U.S. Patent Publication No. 2004/0070772, all of which are incorporated herein by reference.

A typical scatterometry system includes an illumination source that creates a mono or polychromatic probe beam. The probe beam is preferably focused by one or more optical components to create an illumination spot on the surface of the sample under test. A second series of optical components transports the diffracted probe beam to a detector. The detector captures the diffracted energy and produces corresponding output signals. A processor analyzes the signals generated by the detector.

In most cases, a modeling process is used to translate the empirical measurements obtained during scatterometry into physical measurements such as line widths. For this process, a software model is used to represent the expected structure and composition of the sample. The software model is parameterized, allowing characteristics such as line widths and line profiles to be changed. Maxwell's equations are used to predict the diffraction that the modeled structure would impart to the probe beam of the scatterometer. A set of these predicted measurements are generated using variations to the parameters of the model. This process is repeated until the predicted measurements match the empirical measurements to a desired goodness of fit. At that point, the modeled structure and its associated parameters are assumed to match the sample. The predictions can be calculated in advance and stored in a library or calculated in real time (or using some combination of both approaches as is known by one skilled in the art).

To be accurate, the model used during the modeling process must reflect the structure and composition of the sample. Complex samples require correspondingly complex modeling techniques. For one of these techniques, a Riemannian approach is used to model geometric shapes (such as the lines) as stacks of slabs. The height and width of each slab is chosen so that the stack of slabs approximates the shape being modeled. Portions of the shape that change rapidly can be accurately modeled by increasing the number of slabs while decreasing their thickness. Shape portions that are relatively constant may be modeled using fewer, thicker slabs. Models constructed using this technique require two parameters for each slab (height, width) or a total of 2N parameters for N slab models.

The slab-based technique necessarily introduces a degree of roughness into the resulting model. This roughness gives the model edges a staircase-like appearance attributable to the rectangular cross-section of the individual slabs. This side effect can be reduced by using slabs that have a trapezoidal cross-sections or quadrilateral cross-sections. The overall effect is a reduction in stair-stepping at the cost of additional parameters. For trapezoidal cross-sections, three parameters are required for each slab (height, width and one interior angle). Quadrilateral cross-sections require four parameters (height, width and two interior angles).

Quadrilaterals or trapezoids are an effective method for increasing the accuracy of the modeling process. At the same time, the increased number of parameters adds further complexity to an already arduous computational process. As a result, there are continuing efforts to find modeling methods that provide high accuracy while limiting the number of required parameters. This is the goal of the method described, for example in U.S. Pat. No. 5,963,329 (incorporated herein by reference). For this method, the familiar slab-based approach is used to model lines and other geometric shapes. In this case, however, the slabs are subdivided into one or more sub-profiles. Each sub-profile has a reference edge and a reference height. The width of each slab in a sub-profile is defined using an offset (which may be positive or negative) from the reference edge. The height of each slab in a sub-profile is defined as a multiple of the reference height. Each sub-profile also has two scaling factors, one for height and a second for width. Changing the height scaling factor increases or decreases the height of all of the slabs in a sub-profile making the sub-profile taller or shorter. Changing the width scaling factor spreads the sub-profile-slabs that are narrower than the reference edge become narrower still, slabs that are wider than the reference edge become even wider. By controlling the scaling factors for each sub-profile, the overall profile of the line can be varied to produce a range of differing shapes.

The use of sub-profiles and associated scaling factors decreases the number of parameters that are required to define a particular shape. Unfortunately, the use of rectangular slabs suffers from the staircase limitations already described. It is also true that the use of scaling factors is only beneficial when computational results can be re-used as the scaling factors are changed. For cases where this is not possible, the use of scaling factors is computationally similar to more traditional methods for defining slab heights and widths.

Other approaches have been disclosed for generating a model that defines the shape and material properties of the sample. For example, in the above cited U.S. Pat. No. 6,704,661, a method is disclosed wherein an initial model is defined as having a rectangular shape. The optical response of the rectangle is iteratively calculated as the height and width parameters are modified. Once a best fit has been achieved, a new model is created by modifying the optimized rectangle with more than one width and more than one layer. The fitting process is repeated and then further widths and layers are added. This process is continued until the optical response of the model matches the measured data to a predetermined level of fitness.

More recently, the assignee herein developed yet another modeling approach which is described in U.S. Pat. No. 7,145,664, incorporated herein by reference. In this global shape definition technique, a control-point based approach is used to define the geometric shapes within samples. As an example, consider the case of a sample that includes one or more lines. The profile (i.e., the cross-sectional outline) of a representative line is defined using a set of control points. Each control point influences the shape of the line profile. For some cases, this means that control points define shapes in a connect-the-dots fashion. For other cases, a more complex mathematical function, such as Bezier or Spline curve fitting, is used to translate a set of control points into a corresponding shape. It should be noted that the control points are preferably only used to define shapes. Layers within a shape can be modeled independently. An interactive environment allows a user to specify multilayer scatterometry models with single periodicity. The user can add shape profiles by adding groups of control points.

All of the above described techniques have been implemented to evaluate samples having structural features which repeat in a uniform fashion. More recently, samples of interest have become more complex. These samples have a first region where the layer structures repeat with a first periodicity. The samples also have a second region, added on top of the first region, where the layer structures repeat with a different periodicity. Attempting to model these complex multi-periodic samples is difficult. This disclosure addresses this problem.

SUMMARY OF THE INVENTION

In accordance with the subject invention, a modeling approach has been developed which addresses samples with different regions where the structures exhibit different periodicities. In this approach, a first partial model is generated which defines the shape, material properties and periodicity of the first region. In addition, a second partial model is generated defining the shape, material properties and periodicity of the second region. These two partial models are then merged into a combined model. When optimizing the combined model, the shape and material properties of the first and second models are independently adjusted. The optical responses of the model with differing shapes and material properties are calculated and compared to a physical sample. This process is iteratively carried out to derive a final combined model that corresponds to a physical sample.

This approach is particularly suitable for the global shape definition technique described in U.S. Pat. No. 7,145,664. In this case, when the position of a control point is modified in a partial model within the combined model, its effects will be propagated to all of the repeating structures in that partial model. In this manner, the differing periodicity of the regions can be accounted for in the model development.

Further details of the subject invention will be described below in conjunction with the drawings in which:

DETAILED DESCRIPTION OF THE PREFERRED EMBODIMENT

Figure 1:
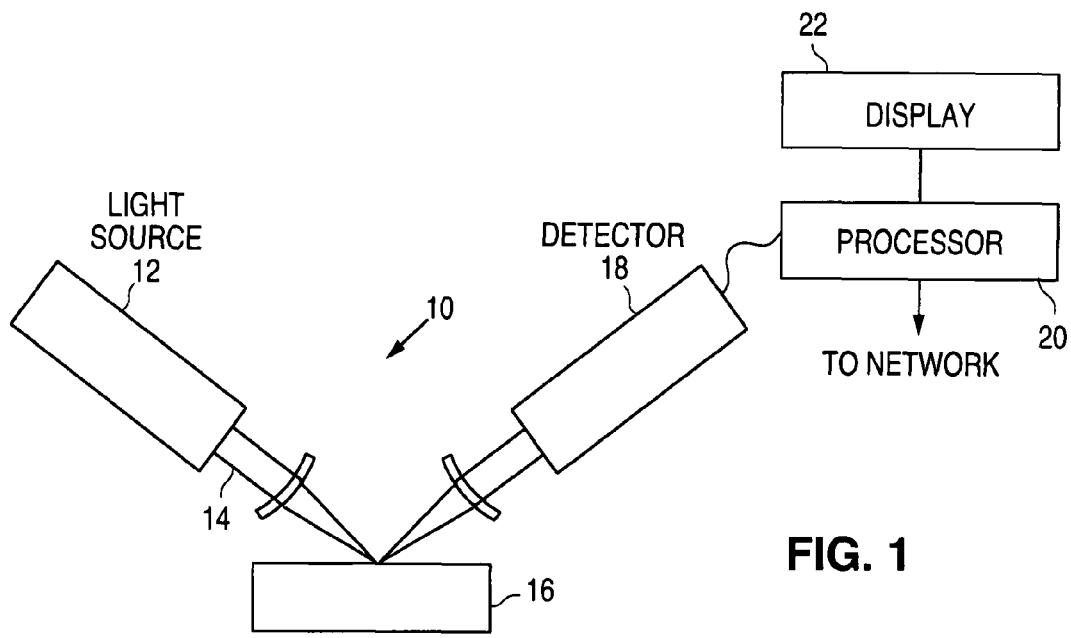
FIG. 1 is a block diagram of an inspection system useable with the subject invention.

FIG. 1 illustrates the basic elements of a scatterometer 10 which can be used in conjunction with the subject invention. A brief overview will be provided of a generic system. Those skilled in the art will appreciate that there are many variations to this design some of which are discussed in the above cited patents and patent applications.

In a scatterometer, a light source 12 generates a probe beam 14 which is focused onto the sample 16. Light reflected from the sample is collected and directed to a detector 18 which generates output signals corresponding to the measured intensity. Typically, multiple measurements are taken, either as a function of angle of incidence or wavelength. In any case, the output signals are supplied to a processor 20 for evaluating the sample. The results can be stored in memory, displayed on a display 22 or sent to a network for further analysis.

As discussed in the background section, the actual measurements are compared to calculated theoretical measurements. These theoretical measurements are calculated by first creating a theoretical model of the structure. The model includes variables related to material properties such as indices of refraction, extinction coefficients, etc. In addition, the model can include definitions of layer thicknesses and shapes. Estimated parameters are fed to the model and calculated optical responses are determined using Maxwell's equations.

Sets of optical responses can be calculated and stored in a look up table for future reference. Alternatively, the model can be iterated in real time and compared with a measured optical response to determine the parameters of a sample.

The subject invention will be described with reference to implementation with a control point modeling approach. However, as noted above, the concept can be used with other modeling approaches.

Figure 2:
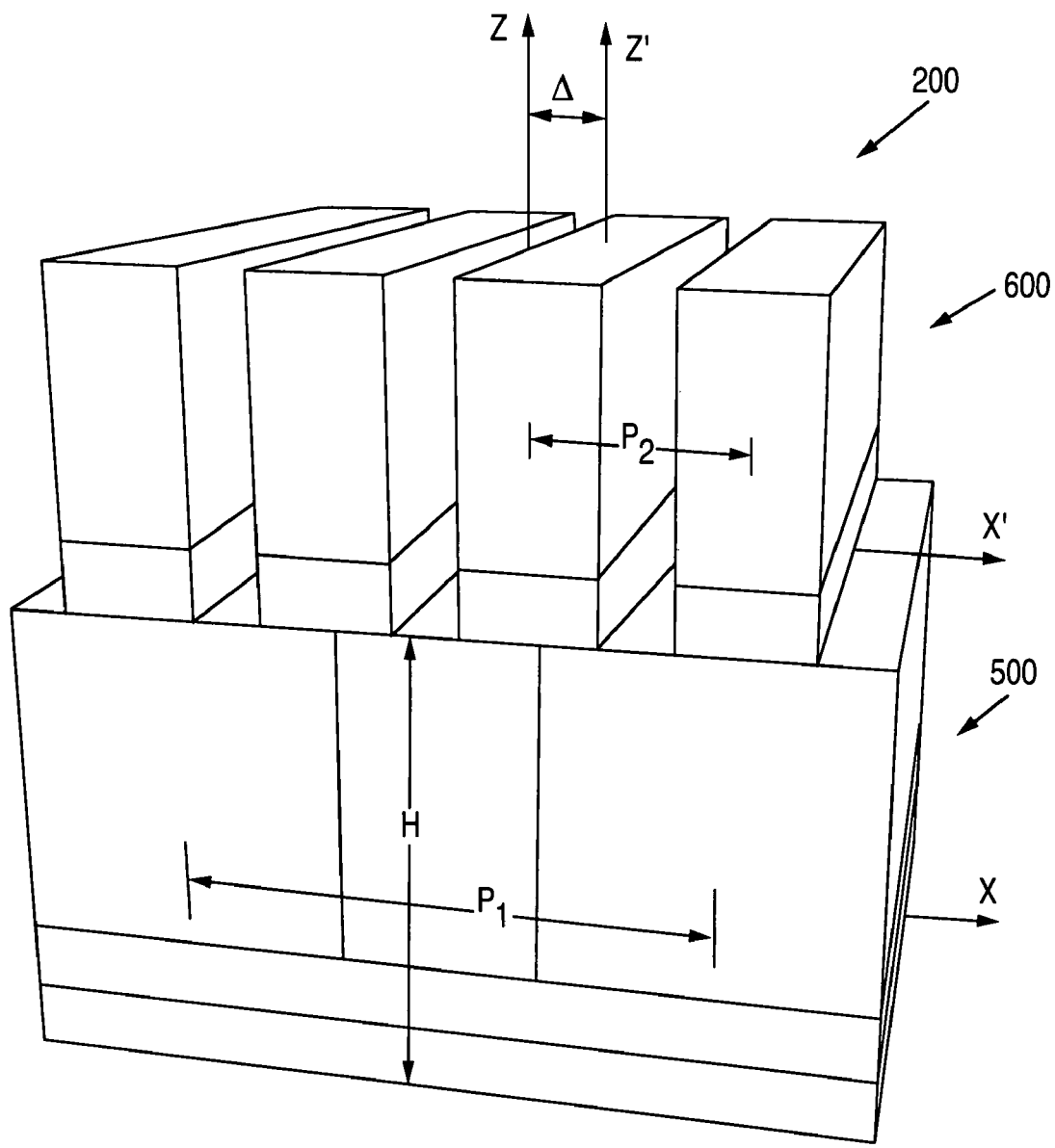
FIG. 2 is a schematic representation of a complex structure with two regions having different periodicity.

FIG. 2 is a cross section showing a sample 200 having two regions with more than one periodicity. The lower region 500 of sample 200 includes three layers: an upper layer; an intermediate layer; and a substrate. Trench fills are located in the upper layer. Each of these layers or trench fills will typically (but not necessarily) be formed using a different material type. Region 500 has a periodicity $P_1$.

The upper region 600 of sample 200 includes two additional layers. These layers have a periodicity of $P_2$.

Figure 3:
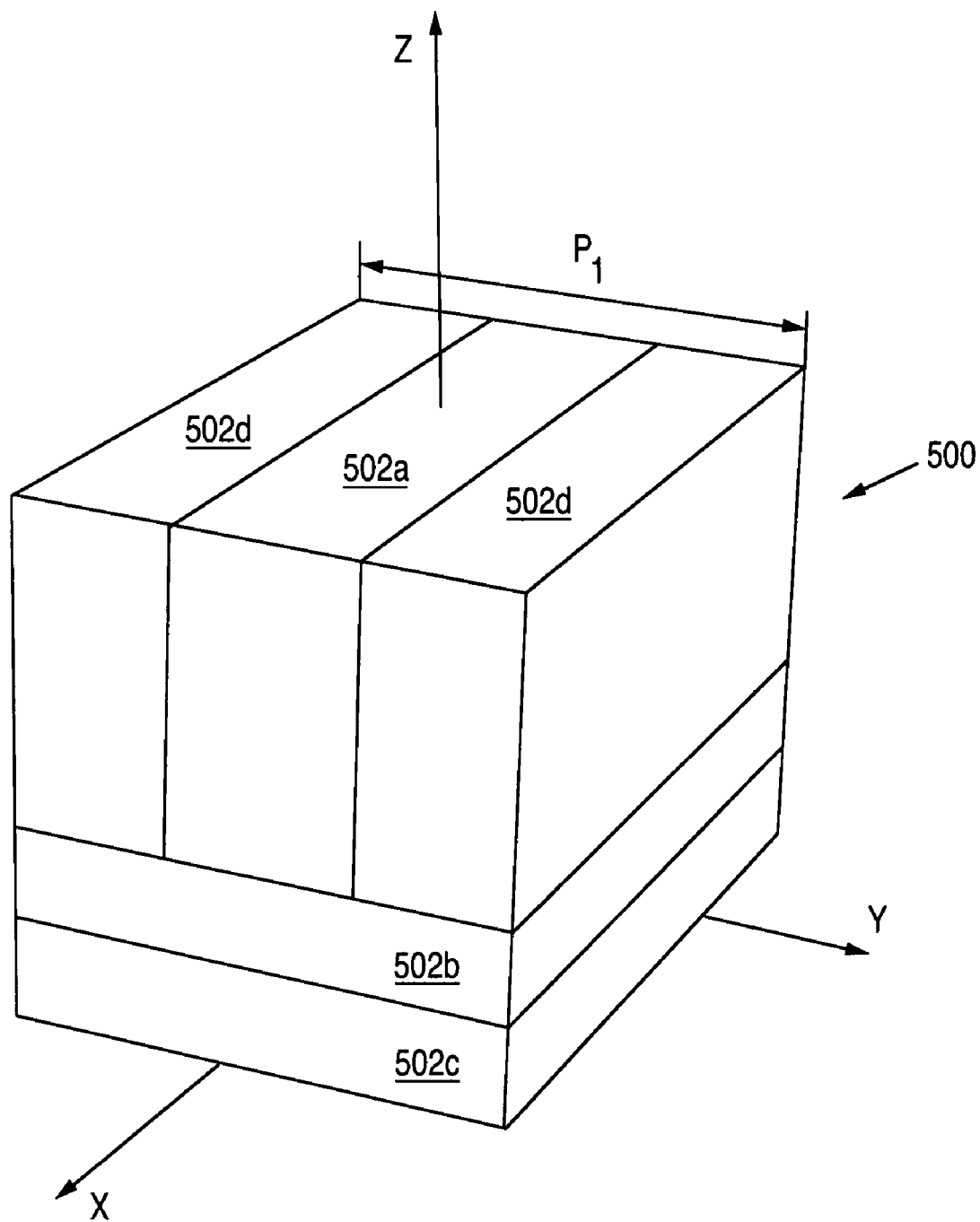
FIG. 3 is a representation of the lower portion of multilayer structure of FIG. 2 having a first periodicity.

In accordance with the subject invention, each of the two regions shown in FIG. 2 is modeled separately. FIG. 3 shows the first region modeled with a control point approach. As noted above, the control points define the geometric shapes in grating structures. The profile or the cross-sectional outline is defined by using a set of control points. Region 500 includes three layers: an upper layer 502a, an intermediate layer 502b, a substrate 502c and trench fills 502d. The shape of structure 500 can be modeled by adding more control points.

Figure 4:
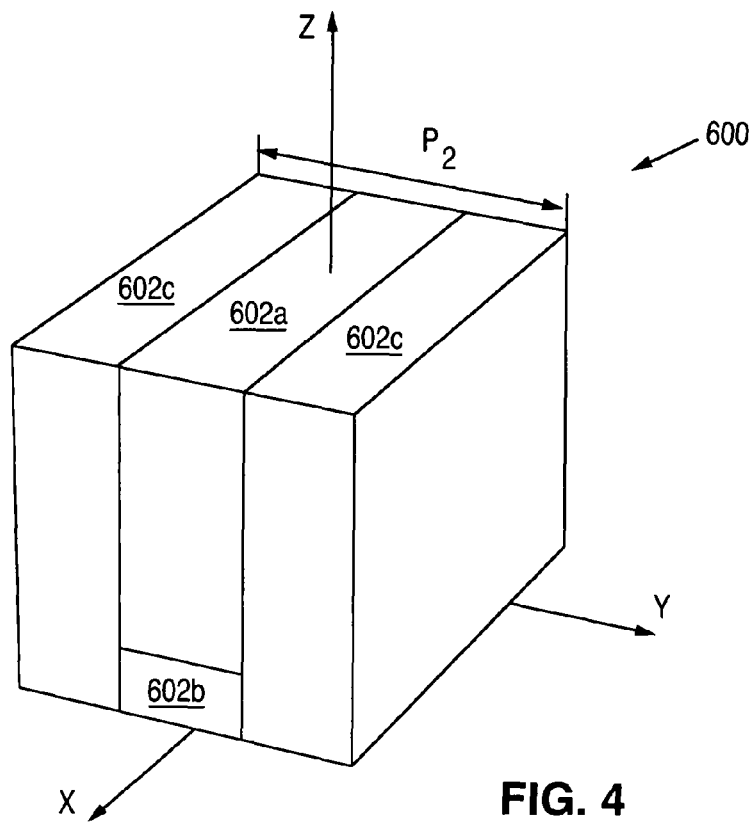
FIG. 4 is a representation of the upper portion of multilayer structure of FIG. 2 having a second periodicity, different from the first periodicity.

FIG. 4 illustrates the second region 600. In this example, the region has two layers with layer one labeled as 602a and the other layer labeled as 602b.

As described in U.S. Pat. No. 7,145,664, the cross sectional shape of a periodic feature can be modeled in a multi-window display which includes an image of the profile with control points in one window, calculated and actual optical responses in a second window, and material parameters and layers structures in a third window. In a preferred approach, each of the regions is separately modeled using the display techniques described above to specifying the width, height, number of controlling points, trench fills and spacers.

Figure 5:
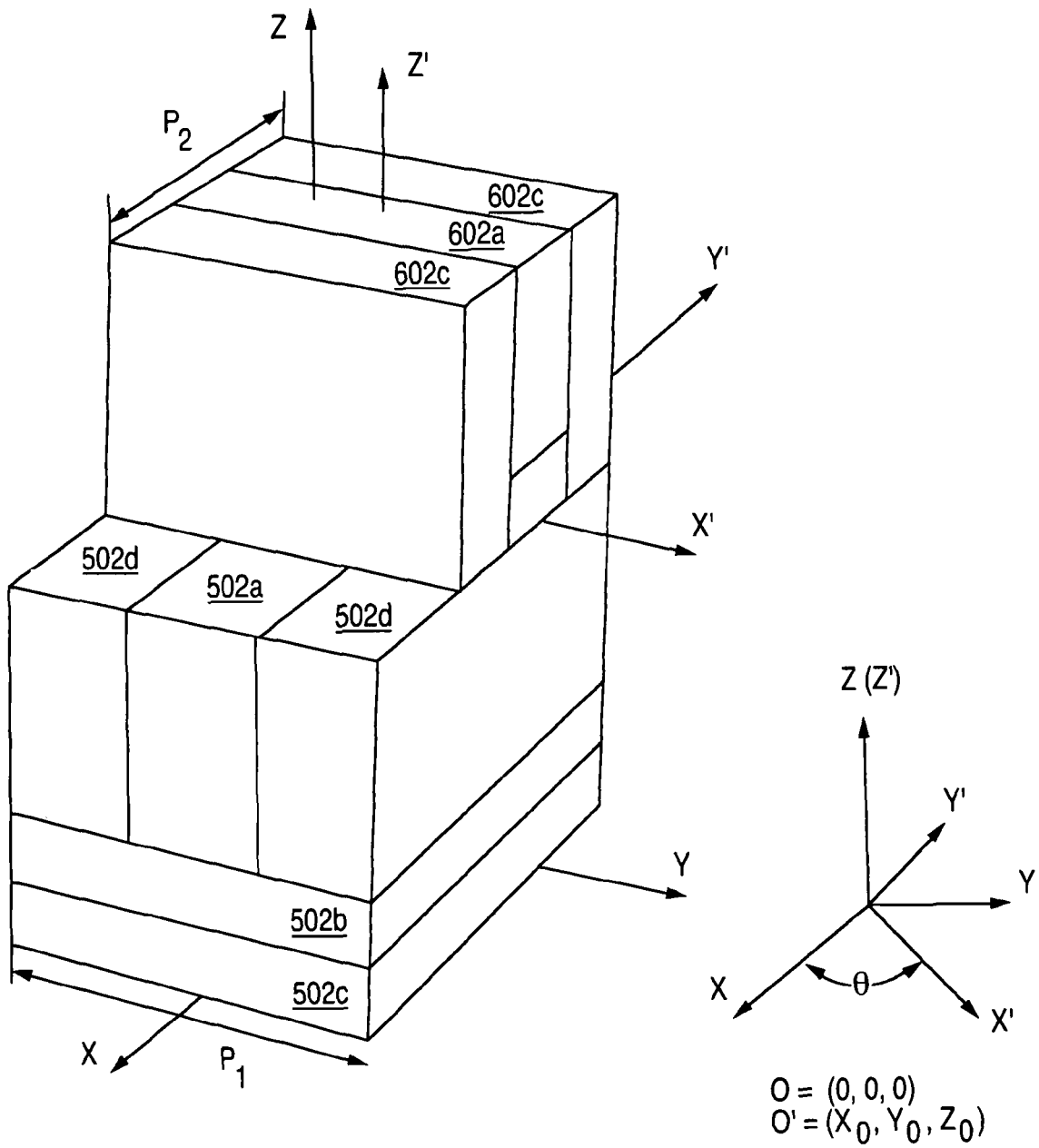
FIG. 5 is a representation of a combined structure which is multi-periodic.

Once the models of the two regions are created, a final, combined model is created with the two individual single periodic structures together in the vector space of the lateral shift (X and Y-axis) and vertical shift (Z-axis). The combined model is illustrated in FIG. 5. In this combined structure, the origin (O) of region 500 remains at (0, 0, 0). The origin (O') of the region 600 can be at an arbitrary vector position $(X_0, Y_0, Z_0)$. For example, in FIG. 5, $X_0=\Delta$, $Y_0=0$, $Z_0=H$.

Once a model has been defined, the interactive display environment may be used to calculate its optical responses. The user may arrive at an accurate model for the sample by iteratively modifying layer properties and shape control points. The display interface of the type described in U.S. Pat. No. 7,145,664 can be used. Since the two regions (500, 600) were separately modeled, the iterative process may be implemented independently for each region. In operation, movement of a control point in region 500 will be mathematically propagated to all repeating structures in region 500 but not region 600. Similarly, movement of a control point in region 600 will be mathematically propagated to all repeating structures in region 600 but not region 500. In this way, the different periodicities can be accounted for in the optimization process.

In a typical set up environment, the model properties are modified while trying to match the calculated optical response with a measured optical response. An optimized model is created once the residual between the calculated measurements and the actual measurements is minimized. This model can then be used in the analysis of subsequent test wafers.

We note that the final complex structure is not limited to only two structures with different periodicity. It can rather be expanded into N structures with $N \geq 2$. Although the appended claims refer to first and second regions with first and second periodicities, it is intended that these claims cover the modeling of any structure with two or more different periodicities. We also note that the second or more structures are not necessarily aligned along X-axis. It can be set at an angle with the X-axis of θ. Examples of the structures of this type are 3D contact holes, etc.

While the subject invention has been described with reference to a preferred embodiment, various changes and modifications could be made therein, by one skilled in the art, without varying from the scope and spirit of the subject invention as defined by the appended claims.

We claim:

1. A method of modeling multilayer structural features formed on a semiconductor wafer, said features including a first region having a first periodicity and a second region having a second periodicity, said method comprising the steps of:

generating a first model defining the shape, material properties and periodicity of the first region;

generating a second model defining the shape, material properties and periodicity of the second region;

combining the first and second models into a combined model;

independently adjusting the shape and material properties of the first and second models and calculating sets of optical responses of the combined model to derive a final combined model that corresponds to a physical sample; and storing parameters associated with the combined model for subsequent evaluation of physical samples.

2. A method of evaluating a semiconductor wafer having multilayer structural features formed thereon, said features including a first region having a first periodicity and a second region having a second periodicity, said method comprising the steps of:

illuminating the wafer with a probe beam of radiation;

collecting the radiation reflected from the wafer;

measuring the reflected light and generating optical signals in response thereto;

comparing the measured optical signals to a set of theoretical signals in order to determine parameters of the wafer, said set of theoretical signals being generated based on a combined model of the structure, wherein the combined model is a combination of a first model and a second model, the first model defining a shape, material properties and periodicity of the region and the second model defining a shape, material properties and periodicity of the second region; and storing the determined parameters of the wafer.

3. A method as recited in claim 2, wherein during the comparison step, the shape and material properties of the first and second models are independently adjusted to modify the generated theoretical signals in order to better match the measured optical signals.

4. A method of modeling multilayer structural features formed on a semiconductor wafer, said features including a first region having a first periodicity and a second region having a second periodicity, said method comprising the steps of:

generating a first model defining the shape, material properties and periodicity of the first region with the profile of the shape being defined by first control points;

generating a second model defining the shape, material properties and periodicity of the second region, with the profile of the shape being defined by second control points;

combining the first and second models into a combined model;

independently adjusting the shape and material properties of the first and second models by adjusting the first and second sets of control points wherein the adjustment of one of the first and second set of control points is propagated to any repeating structure in the associated model and calculating sets of optical responses of the combined model to derive a final combined model that corresponds to a physical sample; and storing parameters associated with the combined model for subsequent evaluation of physical samples.

5. A method as recited in claim 4, wherein combined model having the first and second sets of control points is rendered on a display and the shape of the first or the second model is adjusted by moving the corresponding set of control points on the display.

6. A method of modeling multilayer structural features formed on a semiconductor wafer, said features including a first region having a first periodicity and a second region having a second periodicity, said method comprising the steps of:

generating a first model defining the shape, material properties and periodicity of the first region;

generating a second model defining the shape, material properties and periodicity of the second region;

combining the first and second models into a combined model;

calculating a plurality of sets of optical responses of the combined model corresponding to different parameter sets;

creating a table which matches the sets of the optical response to the associated parameter sets; and storing the table for comparison to optical results obtained from measuring wafers.

* * * * *